July 5, 1938.　　　　J. R. OISHEI　　　　2,122,891

VEHICLE SIGNAL

Filed Feb. 5, 1935　　　　2 Sheets-Sheet 1

INVENTOR
John R. Oishei,
BY
Beau, Brooks, Buckley & Beau.
ATTORNEYS

July 5, 1938.  J. R. OISHEI  2,122,891
VEHICLE SIGNAL
Filed Feb. 5, 1935  2 Sheets-Sheet 2
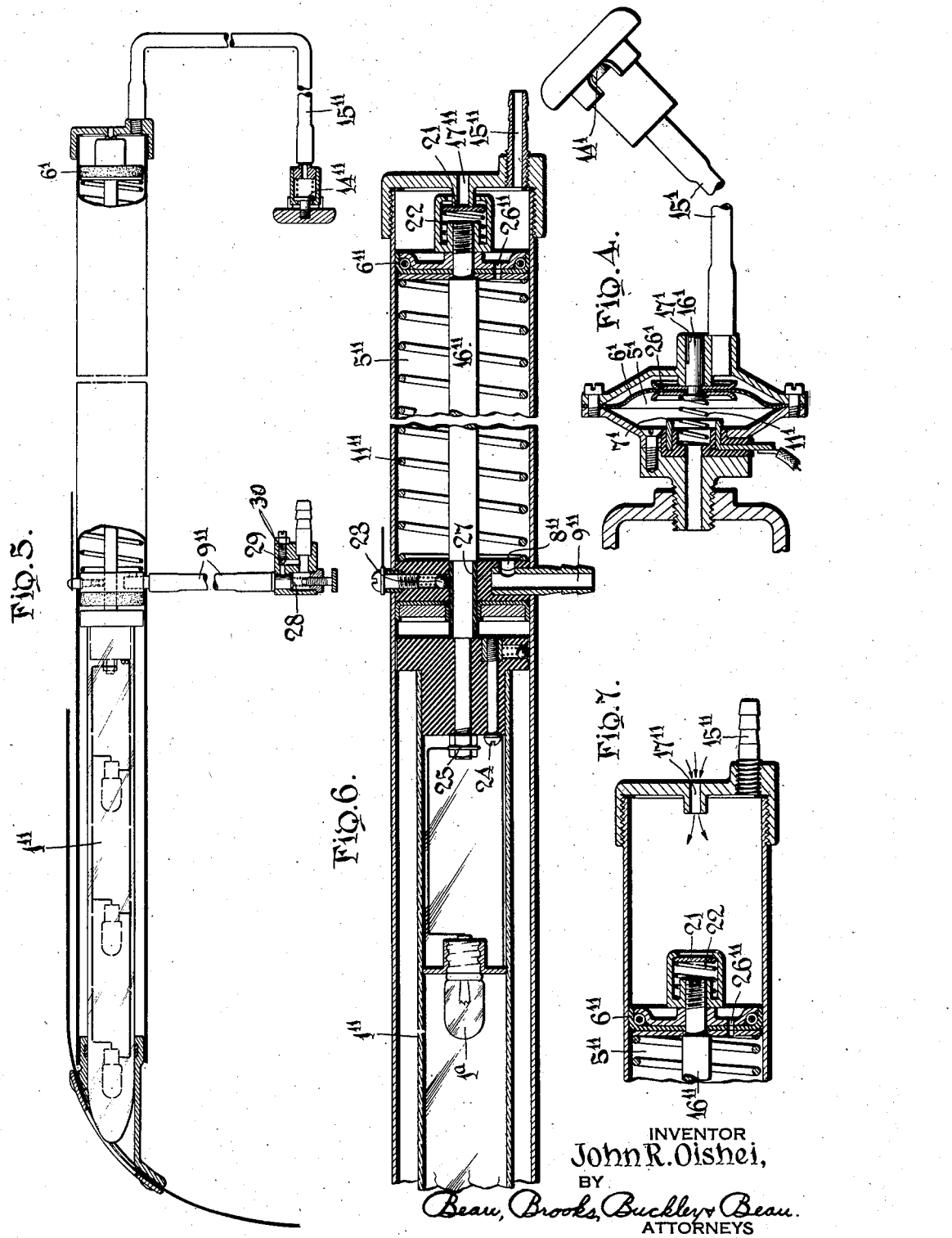
INVENTOR
John R. Oishei,
BY
Beau, Brooks, Buckley & Beau.
ATTORNEYS Patented July 5, 1938

2,122,891

UNITED STATES PATENT OFFICE 2,122,891

VEHICLE SIGNAL

John R. Oishei, Buffalo, N. Y., assignor to Trico Products Corporation, Buffalo, N. Y.

Application February 5, 1935, Serial No. 5,106

22 Claims. (Cl. 116—39)

This invention relates to a signalling system for motor vehicles and it has for its primary object to provide a self-clearing signal which is efficient in operation, simple in construction and economical in manufacture.

It has heretofore been proposed to provide indicator means for giving a signal indicative of a proposed variation in the operation of a vehicle, and while such means have possessed considerable merit they nevertheless have involved expensive equipment and further the given signal could not always be cleared in an accurate manner since this was accomplished automatically by the steering mechanism and sometimes would be cleared accidentally through an unexpected movement of the steering apparatus.

The present invention comprehends a signalling system which is automatically cleared upon operation of the engine accelerating control. Preferably, the retention of the given indication and the clearing of the same are made to depend upon the pressure variations or influences in an engine manifold as the engine is retarded and subsequently accelerated, incidental to the execution of the indicated change of vehicular movement.

In the drawings, Fig. 1 is a view showing a motor vehicle equipped with an indicator system constructed in accordance with the present invention.

Fig. 4 is a view similar to Fig. 2 but depicting a modified form of the invention.

Fig. 5 is a like view showing a further embodiment of the invention.

Fig. 6 is an enlarged sectional view of the embodiment of Fig. 5, and

Fig. 7 is a similar view illustrating the additional air port opened.

Figure 1:
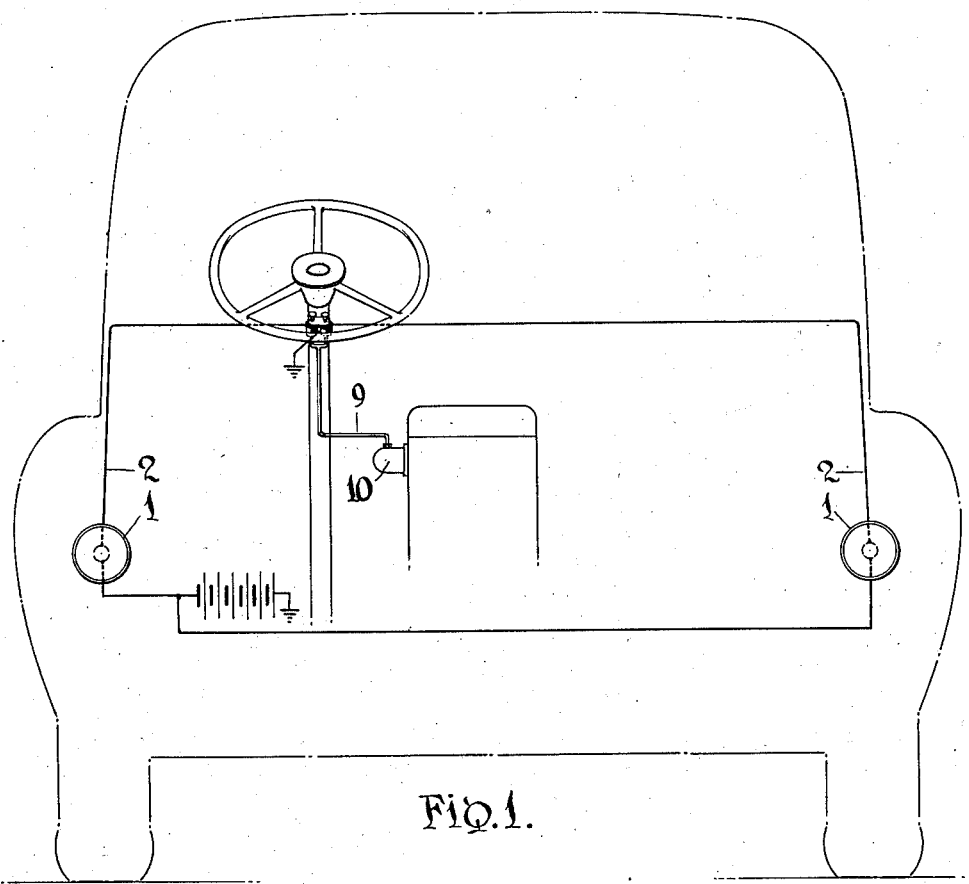
Figures 2, 3:
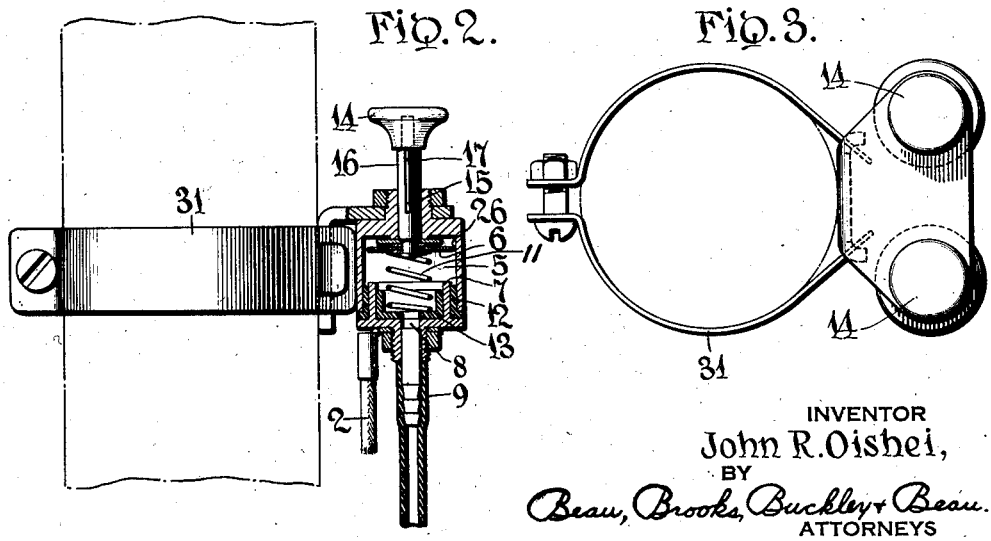
Fig. 2 is a sectional view through the signal actuating unit.
Fig. 3 is a top plan view of the unit and its mounting.

Referring more particularly to the drawings, the numeral 1 designates an indicator of any approved construction and may simply embody a signal light electrically connected by the conductor wire 2 and the ground to a battery. In this circuit is a signal actuating unit which has a switch that is adapted to be maintained closed by a relatively high manifold suction. The unit comprises a chamber 5 having a contact 6, in the form of a piston or wall, movable therein toward and from a fixed contact 7. The fixed contact may be annular and serve as a valve seat about a suction passage 8 which is connected by a conduit 9 to the intake manifold 10 of the motor vehicle power plant. The movable wall 6 serves as a valve when engaging the seat 7 and is held in such engagement by the suction acting on the inner side of the piston and atmospheric pressure acting on the outer side thereof.

Separation of the switch contacts is effected by a spring 11 when the pressure differential is insufficient to secure the engagement. This spring may be compressed between the piston and the opposing wall of the chamber 5 at the suction side thereof.

The suction passage 8 is in constant communication with the chamber 5 while the atmospheric communication on the opposite side of the piston is normally closed. Means are provided normally to equalize the pressure on the opposite side of the piston or movable wall, as by a loose fit of the piston in the cylinder, in effect to provide an equalizing passage 26, and therefore the constant low pressure communication exerts no unbalanced influence on the piston to actuate the signal except when pre-set. However, when the outer side of the piston is subjected to atmospheric pressure, a pressure differential is provided sufficient to urge the piston toward the valve seat 7. The valve seat is preferably metallic and in electrical connection to one side of the electric circuit being insulated from the casing of the chamber 5, as by insulating rings 12 and 13. The movable wall is in electrical connection with the grounded side of the signal circuit so that when engaged on the seat 7, the circuit will be closed and the indicator energized to give the selected indication of the intended change of vehicular movement.

The movement of the movable wall or valve member to its valve seat 7 may be effected by a wholly manual operation, as by manually depressing the control member 14 to its fullest extent, in which case the equalizing passage 26 may be enlarged to avoid fluid resistance to movement of the movable wall. And when the wall has engaged with its seat it will be held thereon by the fluid pressure differential until such time as the pressure differential lessens sufficiently to be overcome by the compressed return spring 11 whereupon the wall or valve will unseat and break the suction hold and the spring will return the wall to its normal position pending its manual reactuation.

Preferably, the movement of the movable wall to its valve seat 7 is effected automatically by a fluid pressure differential after an initial manual operation of the control 14. This will insure the sequence of operation to effect the initiated indication in an automatic manner and free of manual effort. It is accomplished by opening the chamber 5 to the atmosphere at the side of the movable wall opposite to the suction port.

Atmospheric communication is established with the outer side of the movable wall by a manually operable control member 14 which may simply comprise a stem 16 connected to the movable wall and extended through a fixed chamber wall with a close fit to the outside thereof. The stem is provided with a normally closed groove 15 which uncovers, as the stem moves into the chamber 5, to provide a channel of communication from the inside of the chamber to the outside thereof. This, in conjunction with the low pressure communication 8 will effect the desired pressure differential for urging the movable wall inwardly, independently of the manual pressure and bring the same into contact with the seat 7. The groove 15 is extended as indicated at 17, so as to provide additional communication with the atmosphere to maintain the pressure differential and consequently maintain the pre-set signal operative.

If it is desired to provide a remote control for the movable wall of the signal actuating unit, the same may be accomplished by extending the atmospheric passage 15', in the form of a tube, up to within easy reach of the motorist while disposing the unit chamber 5' in a less conspicuous position (Fig. 4). The tube is normally closed by a valve 14' adapted to be opened by the motorist to pre-set the indicator. This unbalances the pressures on opposite sides of the movable wall 6', which may be a diaphragm type of piston equipped with a pressure equalizing passage 26', and causes the wall to move against spring 11' and against seat 7' about the suction port. The signal maintaining air port 17' is normally closed by the diaphragm and may be formed in the guiding stem 16'.

As a further modification, the signal actuating unit may be disposed in the header construction of the windshield or in the roof of the vehicle, as shown in Figs. 5 and 6. In this form of the invention the chamber 5" is provided with a movable wall or piston 6" and has its guiding stem 16" extending in the opposite direction and carrying an indicating member in the form of a translucent tube 1". The movable wall 6" is backed by a spring 11" to resist the suction admitted through port 8" from the manifold to which it is connected by a conduit 9". The pressure equalizing port 26" in the movable wall serves to normally maintain equalized pressures on opposite sides thereof. Leading to an accessible point is an atmospheric air passage 15" which is controlled by the manually controlled valve 14".

When this valve 14" is opened, the atmospheric air enters the chamber at the near side of the movable wall 6" and unbalances the fluid pressure so as to drive the piston toward the low pressure side against the urge of the spring 11". As the movable wall begins its movement, an additional air port 17" is uncovered so as to permit the valve 14" to be closed and still continue the movement of the piston to maintain the indicator operative. When the movable wall 6" is in its normal position, the atmospheric port 17" is closed by a valve 21 on the wall, the same being relatively movable thereon and carried thereby and backed by a spring 22.

The indicator 1" is preferably translucent and houses one or more incandescent bulbs or other lighting means 1ᵃ, one side of the circuit to such lighting means being grounded as indicated at 24 while the opposite side is electrically connected to the guiding rod or stem 16", as indicated at 25. A contact 23 is disposed in the path of the stem 16" so that when the latter moves thereby, the circuit will be closed and the indicator means illuminated, but normally the contact 23 rests on an insulating sleeve 27. In this form of the invention the signal actuating unit not only actuates the electrical indicator 1ᵃ but also mechanically moves the indicator 1".

As a means for retarding the return movement of the indicator 1" the capacity of the manifold passage 9" may be regulated. To this end, the manifold passage may be provided with a check valve 28, closing away from the manifold, so that when a sudden drop in the suction influence occurs the check valve will close to prevent a corresponding sudden change in the pressure in chamber 5". A by-pass 29, circumventing the check valve 28, is provided with an adjustable bleed valve 30, so that the pressure variation in the chamber 5" may be regulated and the return movement of the movable wall controlled.

In operation the motorist will depress his control member 14, 14' or 14" when he desires to give a particular signal, such as when he is stopping his vehicle, or making a turn. This initial opening of the control permits the atmospheric pressure to enter the near side of the chamber of the control chamber, so as to unbalance the pressures on the opposite sides of the movable wall and create a pressure differential sufficient to move the latter to a signal imparting position. As the movable wall begins its movement, the additional atmospheric communication is opened so as to maintain the desired pressure differential while permitting the motorist to release his manual pre-setting control. After the piston or movable wall has traveled a predetermined extent, it effects a closing of the signal circuit or otherwise renders the indicator operative. As the motorist begins to execute his indicated change of vehicular movement, he releases the engine throttle whereby the manifold pressure influence is accentuated and thus the pressure differential maintained to secure the given indication. However, upon the completion of the indicated change and when the engine speed is again being resumed or increased, the manifold suction will drop by reason of the throttle opening, and thereby decrease the pressure differential so as to enable the spring 11, 11' or 11" to restore the movable wall to its normal position and a consequential closing of the atmospheric communication. Being finally restored, the indicator remains dormant until again pre-set by a manual operation.

In practice, a manual pre-setting control will be provided for each indicator, such as one for a left turn, another for a stop, and a third for a right turn. This bank of controls may be conveniently disposed on the steering column, as by a bracket 31, to be within easy reach of the motorist. The setting of the signal is manually accomplished, automatically retained, and uniquely cleared, the entire triple action being performed by the fluid pressure influences and variations thereof in the intake manifold. The battery is thus relieved of severe drainage while at the same time a definite self-clearing of the given indication is made certain. The term "manual" broadly designates any actuation performed on the part of the motorist to initially pre-set the signal.

What is claimed is:

1. A signalling system for motor vehicles having a source of low pressure influence during engine operation, said system having an indicator, a fluid pressure chamber, a wall movable in the chamber with restricted means provided for normally equalizing the fluid pressure on opposite sides of the wall, means providing constant fluid communication between the source of varying pressure and the chamber at one side of the movable wall, manually pre-set means for initially opening the chamber at the opposite side of the wall to the atmosphere for unbalancing the pressures at opposite sides of the wall and creating a pressure differential for moving the latter, means for rendering the indicator operative by and during movement of the wall, means operable by the movable wall for maintaining the atmospheric side of the chamber open to the atmosphere subsequent to the release of the manually pre-set means, and automatic means for restoring the movable wall and rendering such maintaining means inoperative when the pressure influence of such source varies a predetermined degree.

2. A signalling system for motor vehicles having an intake manifold as a source of low pressure influence, said system having an indicator, means for setting the indicator operative and including a chamber, a wall movable in the chamber, means establishing fluid communication between the intake manifold and the chamber at one side of the movable wall, manually pre-set and releasable means for initially opening the chamber at the opposite side of the wall to the atmosphere for unbalancing the pressures on opposite sides of the wall and thereby creating a pressure differential for moving the latter, means for rendering the indicator operative by and during the movement of the wall, means for opening the atmospheric side of the chamber additionally to the atmosphere by and during movement of the movable wall to maintain the required pressure differential subsequent to the release of the manually pre-set means, and means for restoring the movable wall to a position for closing off such additional atmospheric communication when the manifold pressure influence drops to a predetermined degree, there being a restricted pressure equalizing communication from one side of the movable wall to the opposite side thereof for equalizing pressures on both sides thereof when the chamber is not open to the atmosphere.

3. A signalling system for motor vehicles having an intake manifold as a source of low pressure influence during engine operation, said system having an indicator, a chamber, a wall movable in the chamber with means for normally equalizing the fluid pressure on opposite sides of the wall, said chamber being in open fluid communication with the intake manifold at one side of the movable wall, such communication opening into the chamber through a valve seat, a valve part movable by the wall to engage the seat and be held thereon by a pressure differential, manually pre-set means for initially opening the chamber at the opposite side of the wall to the atmosphere for creating a pressure differential to move the wall toward the low pressure side thereof and the valve toward its seat, means rendered operative by and during such movement of the wall to set the indicator, means normally closed by the movable wall and rendered operative upon movement thereof from its normal position for maintaining the communication from within the chamber to the outside atmosphere, and means for automatically restoring the wall to its normal position upon a predetermined drop in the manifold suction incidental to the opening of the engine throttle.

4. In a signalling system for motor vehicles having an intake manifold as a source of suction, an indicator, an actuating unit having a chamber with a wall movable in the chamber by a fluid pressure differential, means for normally equalizing the fluid pressure on opposite sides of the wall, a manifold connection with the chamber at one side of the wall, means for restoring and normally holding the wall in a definite position, an atmospheric port in the chamber at the opposite side of the wall and normally maintained closed thereby, a manually operable means for effecting movement of the wall to open the atmospheric passage whereby to create a pressure differential for moving the wall against the action of the restoring means, and means for rendering the indicator operative by movement of the wall under the fluid pressure differential.

5. In a signalling system for motor vehicles having an intake manifold as a source of suction, an indicator, an actuating unit having a chamber with a fluid pressure responsive wall movable in the chamber, a manifold connection with the chamber at one side of the wall, a spring yieldably holding the wall in a definite position, means for normally rendering the spring the dominant force acting on the wall, an atmospheric port to the chamber at the opposite side of the wall and normally maintained closed thereby, a member manually operable to effect movement of the wall for opening the atmospheric port whereby to create a pressure differential for moving the wall against the action of the spring, means for rendering the indicator operative by movement of the wall under the fluid pressure differential, means for continuing atmospheric communication to the chamber subsequent to a predetermined movement of the wall to maintain the pressure differential and thereby to secure the wall against return by the spring until a drop in the manifold suction to a predetermined degree.

6. In a signalling system for motor vehicles having an intake manifold as a source of suction, an indicator, an actuating unit having a chamber with a wall movable in the chamber by a fluid pressure differential, an open manifold connection with the chamber at one side of the wall, means for normally holding the wall in a definite position and for urging the same to such position when moved therefrom, an atmospheric port to the chamber at the opposite side of the wall and normally maintained closed thereby, manually operable means for effecting movement of the wall to open the atmospheric passage whereby to create a pressure differential for moving the wall against the action of the spring, the manifold connection opening into the chamber through a valve seat, and means for rendering the indicator operative by movement of the wall under the fluid pressure differential, and the movable wall having a part engaging the valve seat, said wall having a pressure equalizing passage leading from one side thereof to the opposite side thereof, such equalizing passage being disposed without the area of the valve seat whereby when said part is engaged with the valve seat the pressure differential will be maintained to hold such part on the seat and thereby maintain the indicator in its set position.

7. In a signalling system for motor vehicles having an intake manifold as a source of suction, an indicator, an actuating unit having a chamber with a wall movable in the chamber by a fluid pressure differential, means for normally equalizing the fluid pressure on opposite sides of the wall, a manifold connection with the chamber at one side of the wall, means for restoring and yieldably holding the wall in a definite position, an atmospheric communication to the chamber at the opposite side of the wall, a manually operable valve normally closing the communication and adapted to be opened to create a pressure differential for moving the wall, a second atmospheric communication to the chamber at the same side of the chamber, means normally closing the second atmospheric communication and rendered inoperative by the movement of the wall to open such second communication to maintain the pressure differential, and means for rendering the indicator operative by and during movement of the wall by the fluid pressure differential.

8. In a signalling system for motor vehicles having an intake manifold as a source of suction, an indicator, means for rendering the indicator operative including a chamber, a wall movable in the chamber, means for normally equalizing the fluid pressure on opposite sides of the wall, resilient means acting upon the wall to urge it to a normal position, a manifold connecting port into the chamber, an atmospheric port leading into the chamber at the opposite side of the movable wall from the suction port whereby to provide a pressure differential to move the wall in opposition to the resilient means, a valve for opening and closing the atmospheric port, a second atmospheric port normally closed by the wall and openable by and during movement of the wall from its normal position whereby to maintain the pressure differential subsequent to the opening of the manually controlled atmospheric port, and means operatively connecting the movable wall to the indicator for operating the same, said resilient means acting to restore the wall to its normal position upon a predetermined drop in the manifold suction.

9. In a signalling system for motor vehicles having an intake manifold as a source of suction, an indicator, means for rendering the indicator operative including a chamber, a wall movable in the chamber, means for normally equalizing the fluid pressure on opposite sides of the wall, resilient means acting upon the wall to urge it to a normal position, a manifold connecting port into the chamber, an atmospheric port leading into the chamber at the opposite side of the movable wall from the suction port whereby to provide a pressure differential to move the wall in opposition to the resilient means, manual means for opening such atmospheric port to initiate movement of the wall, a second atmospheric port normally closed by the wall and openable by and during movement of the wall from its normal position whereby to maintain the pressure differential, means operatively connecting the movable wall to the indicator for operating the same, said resilient means acting to restore the wall to its normal position upon a predetermined drop in the manifold suction, and adjustable means for controlling the return movement of the wall.

10. In a signalling system for motor vehicles having an intake manifold as a source of suction, an indicator, means for rendering the indicator operative including a chamber, a wall movable in the chamber, means for normally equalizing the fluid pressure on opposite sides of the wall, resilient means acting upon the wall to urge it to a normal position, a manifold connecting port into the chamber, an atmospheric port leading into the chamber at the opposite side of the movable wall from the suction port whereby to provide a pressure differential to move the wall in opposition to the resilient means, a valve for opening and closing the atmospheric port, a second atmospheric port normally closed by the wall and openable by and during movement of the wall from its normal position to maintain the pressure differential subsequent to the opening and closing of the manually controlled atmospheric port, means operatively connecting the movable wall to the indicator for operating the same during such wall movement, said resilient means acting to restore the wall to its normal position upon a predetermined drop in the manifold suction, the manifold connection having a check valve closed away from the manifold, and a regulatable by-pass about the check valve by which a sudden drop in manifold suction may have a retarded influence on the movable wall.

11. In a signalling system for motor vehicles having an intake manifold as a source of suction, an indicator, means for rendering the indicator operative including a chamber, a wall movable in the chamber, means for normally equalizing the fluid pressure on opposite sides of the wall, resilient means acting upon the wall to urge it to a normal position, a manifold connecting port into the chamber, an atmospheric port leading into the chamber at the opposite side of the movable wall from the suction port to provide a pressure differential for moving the wall in opposition to the resilient means, a valve for opening and closing the atmospheric port, a second atmospheric port for maintaining the pressure differential subsequent to a closing of the manually controlled atmospheric port, a resiliently mounted valve yieldingly seating over the second atmospheric port to close the same when the wall is in its normal position and opening from its seat when the wall is moving by reason of the pressure differential, and means operatively connecting the movable wall to the indicator for operating the same, said resilient means acting to restore the wall to its normal position upon a predetermined drop in the manifold suction.

12. A control unit for a signalling system for motor vehicles having an intake manifold as a source of suction, comprising a chamber, a wall movable in the chamber, means for normally equalizing the fluid pressure on opposite sides of the wall, resilient means acting upon the wall to urge it to a normal position, a manifold connecting port into the chamber, an atmospheric port leading into the chamber at the opposite side of the movable wall from the suction port whereby to provide a pressure differential to move the wall in opposition to the resilient means, a valve for opening and closing the atmospheric port, a second atmospheric port normally closed by the wall and openable by movement of the wall from its normal position whereby to maintain the pressure differential subsequent to the closing of the manually controlled atmospheric port, said resilient means acting to restore the wall to its normal position upon a predetermined drop in the manifold suction.

13. A signalling system for motor vehicles having an intake manifold as a source of suction, comprising an indicator, means for rendering the indicator operative and including a chamber, a movable member in the chamber, means for normally equalizing the fluid pressure on opposite sides of the movable member, resilient means acting upon the member to urge it to a normal position, a manifold connecting port opening into the chamber on one side of the movable member and cooperating therewith to form a valve, an atmospheric port leading into the chamber on another side of the movable member and cooperating therewith to form a valve, a valve for opening and closing the atmospheric port, and means for moving the movable member from its seating position on the atmospheric port to a seating position on the manifold connecting port, and means whereby the said movement of the movable member to the seating position on the manifold connecting port will effect the actuation of the indicator, said resilient means acting to restore the movable member to its normal position upon a drop in the manifold suction to a predetermined point.

14. In a signalling system for motor vehicles having a source of fluid pressure varying in pressure influence according to engine throttle position, an indicator, fluid pressure actuated means connected to the source of pressure and operable to give an indicator setting, said means being normally disposed so as to be unaffected by the pressure influence, manual means operable to render said first means responsive to such pressure influence, and means operable upon a predetermined variation in the pressure influence to render inoperative both the indicator and said pressure actuated means.

15. In a signalling system for a motor vehicle having a power plant with an intake manifold, an indicator, automatic means for temporarily maintaining the indicator in operative condition, manually controlled means for initiating actuation of said automatic means, and means automatic with a predetermined drop in intake manifold pressure, such as during the acceleration of the motor vehicle, for restoring the indicator to its inoperative condition.

16. A control for a signal for a motor vehicle, the latter having a source of varying fluid pressure, said control comprising an actuating unit having a fluid pressure chamber, a wall movable in the chamber, restricted means being provided for normally equalizing the fluid pressure on opposite sides of the wall, means for providing constant fluid communication between the source of varying pressure and the chamber at one side of the movable wall, manually pre-set means for initially opening the chamber at the opposite side of the wall to the atmosphere for unbalancing the pressures at opposite sides of the wall and creating a pressure differential for moving the latter to another position, means for rendering the indicator operative by and during movement of the wall, means operable by the movable wall for maintaining the atmospheric side of the chamber open to the atmosphere subsequent to the release of the manually pre-set means to retain said movable wall in such other position, and automatic means for restoring the movable wall and rendering such retention means inoperative when the pressure influence of such source varies a predetermined degree.

17. In a signalling system for a motor vehicle having a power plant in which power plant a varying force is developed during varying operating conditions, an indicator normally inoperative, manually controlled means for rendering the indicator operative, holding means responsive to said varying force for maintaining the indicator operative when the degree of said varying force is within a predetermined range, and means for automatically releasing said holding means, said releasing means becoming operative when the degree of said varying force is not within said predetermined range.

18. In a signalling system for a motor vehicle having a source of fluid pressure of varying degree, a signal means movable to different positions to control said signal, means associated with said source and effective to hold the control means in one of said positions when said pressure is within a predetermined range, and means responsive to a pressure change for effecting movement of the control means to the other of said positions when said pressure is without said predetermined range.

19. In signal apparatus for a motor vehicle having a source of variable fluid pressure, a signal normally in non-indicating condition, manual control means for effecting an indicating condition of said signal, and means responsive to fluid pressure of said source for retaining the signal in indicating condition when the pressure is within a predetermined range and otherwise allowing the signal to return to non-indicating condition.

20. In a control unit a casing, an operating member movable from a first to a second position, a first element carried by said member in said casing, a second element in the casing against which the first element abuts when the operating member is moved to said second position, the surface of one of said elements being recessed to define a suction chamber when the elements are in abutment, said second element having a passage leading from such chamber to a source of suction, means for admitting atmosphere into said casing when said elements are in abutment, and means for urging said members from abutting relation when the suction is ineffective.

21. In a signalling system for a motor vehicle having a power plant in which power plant a varying force is developed during varying operating conditions, an indicator normally inoperative, manually controlled means for rendering the indicator operative, holding means responsive to said varying force for maintaining the indicator operative when the degree of said varying force is within a predetermined range, means for automatically releasing said holding means, said releasing means becoming operative when the degree of said varying force is not within said predetermined range, and means for retarding the action of said releasing means.

22. In a signalling system for a motor vehicle having a fluid intake normally constituting a source of suction, an indicator signal, control means movable to one of plural positions for controlling said signal, means associated with the fluid intake and effective to hold the control means in one of said positions when the suction of the intake is of a predetermined degree, and means for allowing the control means to assume another of said positions when the suction is of lesser degree.

JOHN R. OISHEI.